United States Patent
Challener (10) Patent No.: US 11,249,011 B2
(45) Date of Patent: Feb. 15, 2022

(54) APPARATUS AND METHOD FOR EVANESCENT WAVEGUIDE SENSING

(71) Applicant: Global Life Sciences Solutions USA LLC, Marlborough, MA (US)

(72) Inventor: William Albert Challener, Niskayuna, NY (US)

(73) Assignee: Global Life Sciences Solutions USA LLC, Marlborough, MA (US)

( * ) Notice: Subject to any disclaimer, the term of this patent is extended or adjusted under 35 U.S.C. 154(b) by 302 days.

(21) Appl. No.: 16/342,600

(22) PCT Filed: Oct. 19, 2017

(86) PCT No.: PCT/US2017/057345
§ 371 (c)(1),
(2) Date: Apr. 17, 2019

(87) PCT Pub. No.: WO2018/075744
PCT Pub. Date: Apr. 26, 2018

(65) Prior Publication Data
US 2019/0265157 A1    Aug. 29, 2019

Related U.S. Application Data

(60) Provisional application No. 62/409,899, filed on Oct. 19, 2016.

(51) Int. Cl.
*G01J 3/02* (2006.01)
*G01N 21/21* (2006.01)
(Continued)

(52) U.S. Cl.
CPC ............... *G01N 21/21* (2013.01); *G01J 3/02* (2013.01); *G01N 21/552* (2013.01); *G02B 6/34* (2013.01)

(58) Field of Classification Search
CPC ........ G01J 3/28; G01J 3/18; G01J 3/26; G01J 3/44; G01J 3/02; G01N 21/21; G01N 21/552; G02B 6/34
See application file for complete search history.

(56) References Cited

U.S. PATENT DOCUMENTS 5,446,534 A    8/1995  Goldman
5,889,279 A    3/1999  Couston
(Continued)

FOREIGN PATENT DOCUMENTS

| CH | 701504 A2 | 1/2011 |
|---|---|---|
| EP | 2450693 A1 | 5/2012 |

(Continued)

OTHER PUBLICATIONS

European Office Action for EP Application No. 17794154.9 dated Apr. 30, 2020 (21 pages).
(Continued)

*Primary Examiner* — Abdullahi Nur
(74) *Attorney, Agent, or Firm* — Eversheds Sutherland (US) LLP (57) ABSTRACT

An apparatus and an associated method is provided for waveguide spectroscopy of a sample inside a container. The apparatus may include a substrate with a window that is transparent at the wavelengths of interest and is coupled to the container holding a sample; a waveguide core of a material that is transparent at the wavelengths of interest located on an inner surface of the transparent window adjacent the sample, the waveguide core having a refractive index greater than that of the sample, an optical element configured to couple light into and out of the waveguide, and a light source and one or more detectors located outside of the container.

23 Claims, 10 Drawing Sheets (51) Int. Cl.
  *G01N 21/552* (2014.01)
  *G02B 6/34* (2006.01)

(56) References Cited

U.S. PATENT DOCUMENTS

| | | |
|---|---|---|
| 6,268,915 B1 | 7/2001 | Abraham et al. |
| 2002/0003627 A1 | 1/2002 | Rieder |
| 2016/0041160 A1 | 2/2016 | Kanayama et al. |
| 2016/0363728 A1* | 12/2016 | Wang .................. G01N 21/648 |

FOREIGN PATENT DOCUMENTS

| | | |
|---|---|---|
| JP | 2005-300212 A | 10/2005 |
| JP | 2007-101471 A | 4/2007 |
| JP | 2008-064685 A | 3/2008 |
| JP | 2016-114357 A | 6/2016 |
| WO | 91/03728 A1 | 3/1991 |
| WO | 2016/086090 A1 | 6/2016 |

OTHER PUBLICATIONS

Barrios et al., "Demonstraction of Slot-Waveguide Structures on Silicon Nitride / Silicon Oxide Platform," Optics Express, 2007, 15(11):6846-6856.
Khodadad et al., "Optimization of Multiple-Slot Waveguides for Biochemical Sensing," Applied Optics, 2014, 53(23):5169-5178.
Lukosz, "Integrated Optical Chemical and Direct Biochemical Sensors," Sensors and Actuators, 1995, 29:37-50.
PCT International Search Report and Written Opinion for PCT Application No. PCT/US2017/057345 dated May 3, 2018 (18 pages).
Japanese Office Action for JP Application No. 2019-520841 dated Aug. 2, 2021 (11 pages).

* cited by examiner

APPARATUS AND METHOD FOR EVANESCENT WAVEGUIDE SENSING

CROSS REFERENCE TO RELATED APPLICATIONS

The present application claims the priority and benefit to PCT/US2017/057345, filed Oct. 19, 2017 which claims priority and benefit to U.S. Provisional Application Ser. No. 62/409899, filed Oct. 19, 2016, the disclosures of which are incorporated in their entirety herein by reference.

TECHNICAL FIELD

The subject matter disclosed herein generally relates to an apparatus and method for evanescent waveguide sensing.

BACKGROUND

Attenuated total reflection spectroscopy is a technique for measurement of chemical/biological compounds for their identification, measurement of concentration, etc. Several approaches have been reported. In one reported approach, by reducing the thickness of the ATR crystal until it becomes less than a few wavelengths in thickness, also known as a planar waveguide, the sensitivity of the technique is enhanced due to the large increase in multiple reflections at the interface of the waveguide with the sample. Enhancements as large as 10,000 have been reported.

It is also often of interest to measure a spectra of a chemical or biological compound in the infrared region where distinctive absorption lines exist in order to determine, for example, the concentration of the compound in solution. However, in many cases the absorption bands of the compound of interest are very weak. For example, an absorbance of a 10 mMol concentration of a compound may be only 0.0002 to 0.0035 in a wavelength band of 2 to 2.4 µm. Therefore, it is desirable to maximize the effect of the absorbance of the solution on the waveguide properties. In addition, careful correction for instrumental drifts is required in order to accurately measure the small changes in waveguide transmittance that are associated with these absorption bands.

In a reported approach, a means of coupling light through a substrate into a waveguide is described. However, a complex combination of a prism and two gratings are needed to obtain broadband coupling.

Another reported technique uses a single prism located on the same side of the substrate as the waveguide to couple light into the waveguide. However, in this technique, because the light is coupled into the waveguide from the same side as the sample, the light cannot be easily coupled into a sealed container.

Waveguide spectroscopy or attenuated total reflection spectroscopy has been previously discussed as a means for making spectroscopic measurements of solutions without the need for transmitting light through a solution. In a reported technique of waveguide spectroscopy, the light is not transmitted through the solution. Instead, the solution is adjacent to a waveguide core and interacts with the waveguide only within the evanescent field of the waveguide mode inside the solution, which is typically only on an order of a wavelength. Therefore, the effect of scattering particles within the solution is reduced. Only particles that are attached or nearly attached to the core of the waveguide may have any effect on the light propagating through the core of the waveguide.

However, particles, and particularly cells, may have a propensity to settle onto or attach themselves to the waveguide core over time. Even though these particles only interact with the core to the extent that they lie within about a wavelength of the core surface, they can still affect the spectrum of the light transmitted through the core by scattering light out of the core. Therefore, conventional waveguide spectroscopy can still be affected by particles in solution.

Typically, the waveguide core has a thickness that supports multiple TE and TM modes. The core may also be specifically designed or configured to transmit just one TE and one TM mode.

Frequently, a background spectrum is measured for a solution without any dissolved compounds just prior to making a measurement of the sample solution. It is assumed that the spectral intensity of the light source, detector and instrumental response, among other factors, does not change during the interval between measurements of the background and of the sample solution so that the background spectrum can be used to accurately normalize the sample spectrum. In some cases, however, it is not possible to measure a background spectrum immediately prior to the sample measurement. For example, when a solution must be monitored over a period of weeks without the opportunity to periodically measure a background spectrum. In this situation, a background spectrum measured at the beginning of the sample measurements may not be used to accurately normalize the sample spectrum if any instrumental drifts, for example, changes in spectral output of the light source, occurred over time.

SUMMARY

The current invention addresses the need for measurement of concentrations of various components of a solution that may also contain particles, including but not limited to, light scattering particles. For example, in a bioreactor, it is often necessary to monitor concentrations of glucose, lactate, glutamate, ammonia and other biochemicals as cells within the bioreactor are growing. It is not practical to make a transmitted light spectral measurement through a solution of the bioreactor to determine concentrations of these biochemicals because the cells within the solution scatter the light as the light propagates through the solution, which not only greatly reduces the amount of light transmitted through a given solution thickness to a point of undetectability, but also changes the spectral dependence of the transmitted light.

The current invention also addresses the need for a simple means for coupling light into and out of the waveguide on a substrate such that the light passes through the substrate from the opposite side of the waveguide. This is a requirement for using a waveguide sensor when the waveguide is located inside a sealed container, while a light source and a detector are located outside of the container. The means for coupling light into and out of the waveguide may include, for example, an optical element configured to couple light into and out of the waveguide. The optical element may include, a prism, a grating, or other similar optical elements known to one skilled in the art. One aspect of this invention provides an apparatus and method for waveguide spectroscopy using a silicon substrate in which the light source and the detector are located on the opposite side of the substrate from the sample.

In one embodiment, an apparatus is provided for waveguide spectroscopy of a sample inside a container. The apparatus comprises: a substrate with a window that is transparent at the wavelengths of interest and is coupled to the container holding a sample; a waveguide core of a material that is transparent at the wavelengths of interest located on an inner surface of the transparent window adjacent the sample, the waveguide core having a refractive index greater than that of the sample, an optical element configured to couple light into and out of the waveguide, a light source located outside of the container; and one or more detectors located outside of the container.

In another embodiment, a ridge waveguide is provided for performing waveguide spectroscopy on a sample containing particulates, the ridge waveguide comprises two or more ridges with a gap between the top surface of the ridges such that the gap is approximately one wavelength or less and is less than the smallest dimension of the particulates.

The waveguide may comprise a cladding and the waveguide core has a refractive index greater than that of the cladding deposited between the core and the substrate. In some other embodiments, the waveguide may comprise a cladding and cladding has a refractive index less than that of the substrate, and the cladding has a thickness that is three or more wavelengths. In yet some embodiments, the waveguide core may have a refractive index greater than that of the substrate.

The waveguide core may be a thin film waveguide core. In some embodiments, the waveguide core may have a thickness configured to transmit a single TE polarized waveguide mode. In some other embodiments The waveguide core may have a thickness configured to transmit a single TE polarized waveguide mode and a single TM polarized mode. The waveguide core and cladding layers may have a thickness in the waveguide that are configured to support a single TE and TM mode or configured to be greater than a predetermined value for a propagating mode.

The waveguide core may be made of a material selected from a group consisting of $Si_3N_4$, $Al_2O_3$, $Ta_2O_5$, $Si_xO_y$, $N_{1-x-y}$, Si, Ge, diamond, ZnS, and ZnSe. The waveguide may have a cladding made of a material selected from a group consisting of $SiO_2$ $MgF_2$, $CaF_2$, and $Si_xO_yN_{1-x-y}$. The substrate may be made of a material selected from a group consisting of Si, glass, fused silica, $Al_2O_3$, ZnS, ZnSe, diamond, KBr, $BaF_2$, and $CaF_2$.

In some embodiments, the apparatus may include a device located outside of the container and configured to make spectroscopic measurements. The device may include at least one of a spectrometer and a filter.

In yet another embodiment, a method is provided for measuring a waveguide spectra using a system, the system comprises a polarized light comprising a waveguide in contact with a sample that supports both TE and TM waveguide modes, a light source, a polarizer, and a detector. In some embodiments, the polarizer may rotate at a specific frequency causing a polarization of the transmitted light to rotate.

The polarizer may comprise a multi-segment polarizer that rotates at a specific frequency in which neighboring polarizer segments are oriented orthogonal to each other, and half of the segments are oriented to pass light appropriate for TE waveguide modes and half are oriented to pass light for TM waveguide modes.

In some embodiments, the polarizer does not rotate and is fixed at an orientation that passes light at 45° to that which excites either TE or TM waveguide modes. In some embodiments, a polarizer does not rotate but is fixed at a 45° orientation with respect to a waveguide.

BRIEF DESCRIPTION OF THE DRAWINGS

FIG. 4 illustrates an embodiment of the present disclosure in which a waveguide with a core, for example, a SiN core and a cladding, for example, an $SiO_2$ cladding is deposited on a Si substrate. The thickness of the cladding is generally several wavelengths to ensure that a light that enters the core does not couple back out into the substrate too quickly. The substrate is substantially transparent below its bandgap, i.e., for wavelengths $>\sim 1$ μm. At a wavelength of 2 μm, the refractive index of water is 1.438, of $Si_3N_4$ is 1.924, and of $SiO_2$ is 1.326. There is a planar waveguide mode in a film stack that is a transverse electric polarization (TE) mode and has a mode index of 1.4806. The refractive index of Si is 3.449 at this wavelength. Prisms made of SF6 glass have a refractive index of 1.75 at this wavelength. A light beam at this wavelength with an angle of incidence, θ, of about 57.8° will couple energy evanescently into the waveguide. For an SF6 prism with $\beta=45°$, $4=68°$, the angle of incidence of the light beam within the silicon is about 25.4°. The critical angle between the silicon substrate and water is 24.6°. Therefore, there is a total internal reflection at the silicon substrate, as a result, no light is transmitted into the water.

FIG. 9 illustrates an embodiment of the present disclosure in which a ridge waveguide comprising multiple ridges is disposed on top of a substrate. The waveguide may be designed so that the top surface of each ridge is slightly wider than the rest of the ridge, as illustrated in FIG. 9. The gaps at the top surface of the ridges between the ridges are narrower than the size of particulates. For example, if the particulates are primarily cardiomyocytes in a bioreactor solution with an elongated shape that is typically 100 μm long and 10 μm to 25 μm wide, then the gaps between ridges at the top surface may be only 5 μm wide, thereby preventing entry of the cells into the regions between the ridges where there is a stronger electric field but still allowing the fluid in the bioreactor to fill the spaces between the ridges and interact with the field from a waveguide mode.

FIG. 11 (a) illustrates a sheet polarizer or a wire grid polarizer attached to a rotating mount, according to an embodiment of the present disclosure.

FIG. 11 (b) illustrates a rotating mount with multiple segments, according to an embodiment of the present disclosure. Within each segment is a sheet polarizer or a wire grid polarizer such that the directions of polarization in adjacent segments are orthogonal.

DETAILED DESCRIPTION

The present disclosure describes a substrate that is transparent at wavelengths of interest and upon which is deposited a waveguide core and cladding thin films. The refractive index of the core may be greater than the refractive index of the cladding and/or the substrate. If the refractive index of the substrate is larger than that of the core, then the cladding may be several wavelengths thick to partially isolate the core from the substrate and reduce light leakage from the core waveguide mode into the substrate. If the refractive index of the substrate is less than that of the core, then there is no need for a cladding layer because the substrate itself acts as the cladding.

A prism or a diffraction grating or a combination of the two may be used to couple the light through the substrate into the waveguide. The prism may be located on the outer surface of the substrate or on the window outside of the container. In some embodiments, the grating may be located within the waveguide or adjacent the waveguide on the inside of the container. In some embodiments, the grating may be located at the waveguide-substrate interface.

Figure 1:
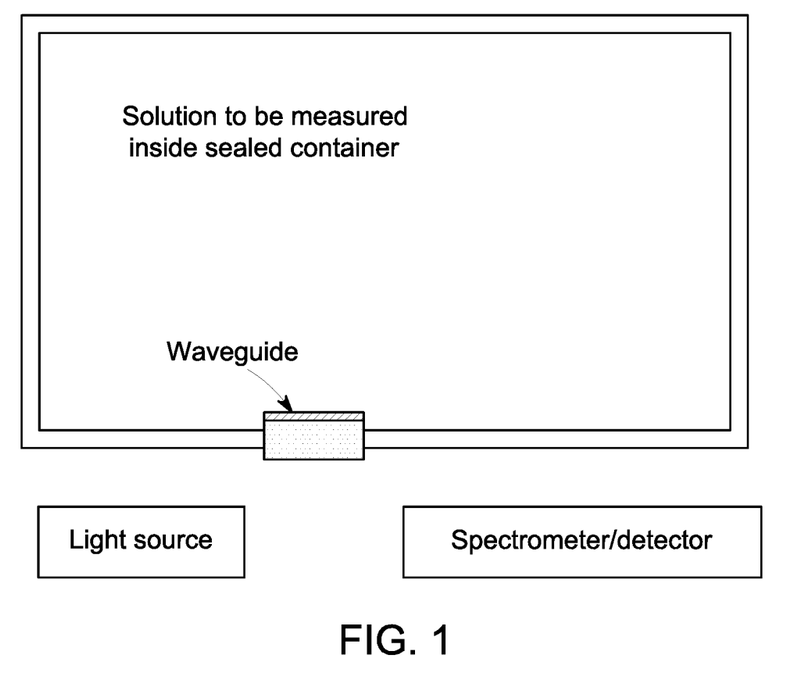
FIG. 1 illustrates an example of a container having a window port at one location with a waveguide on the inside surface of the container, and spectroscopy optics located outside of the container, according to an embodiment of the present disclosure.
Figure 2:
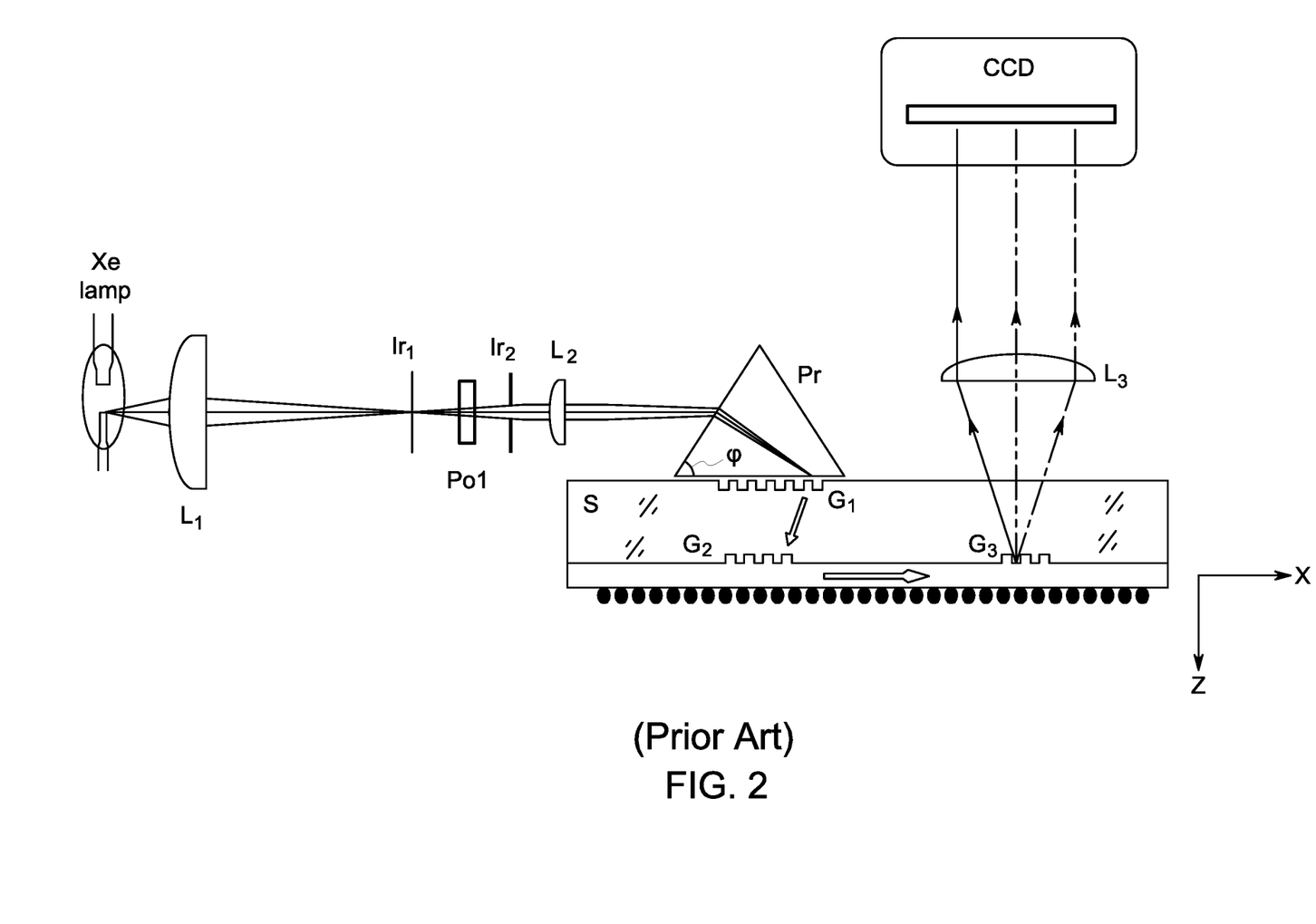
FIG. 2 illustrates a conventional apparatus in which light from a broadband source is focused through a prism, Pr, onto grating, G1, on a top surface of a substrate S, and then a second grating, G2, on a bottom surface of the substrate S in order to launch light into a waveguide running along the bottom surface of the substrate S.
Figure 3:
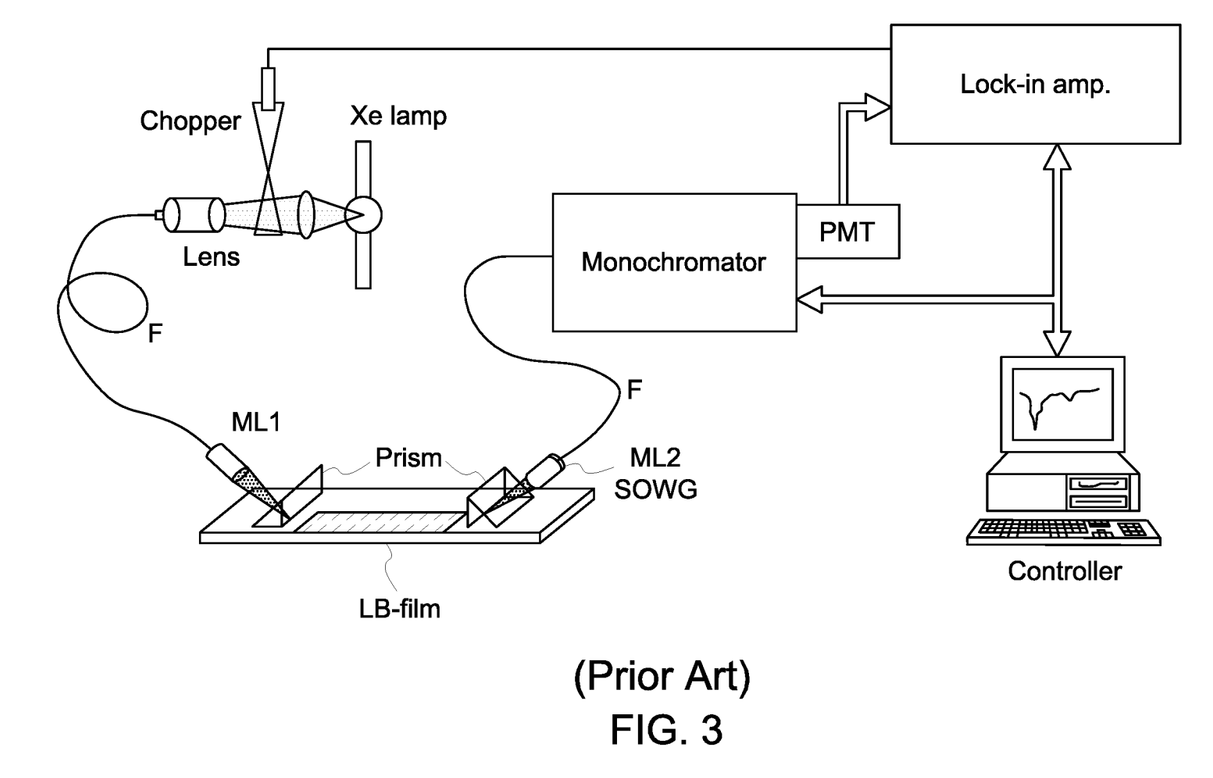
FIG. 3 illustrates a conventional apparatus in which light from a broadband source is focused through a prism, Pr, onto a waveguide on the same side of a substrate.
Figure 4:
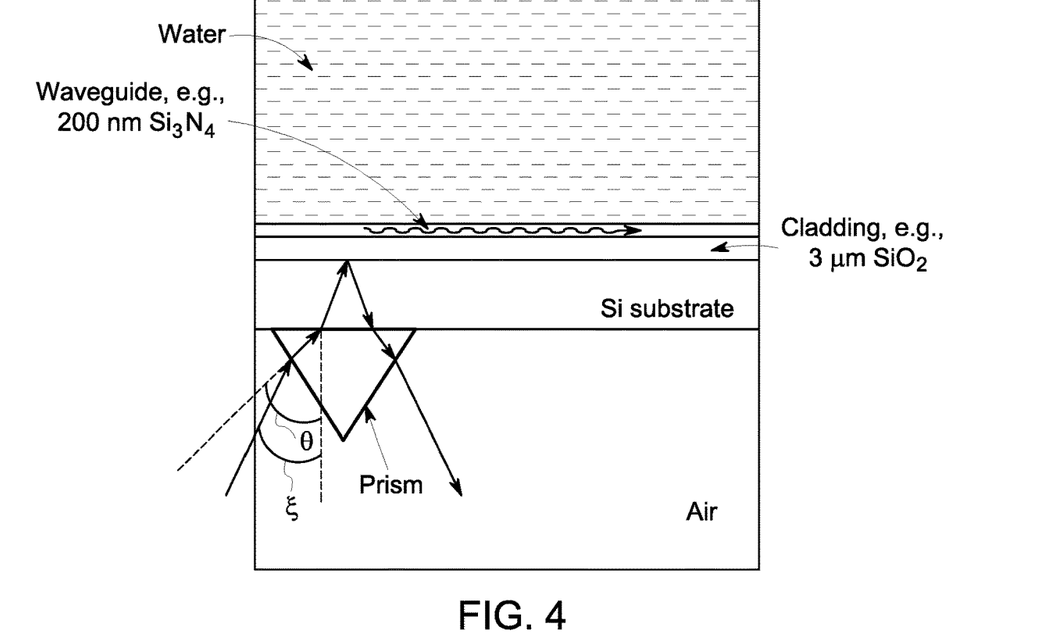

In order for a light beam incident from the back side of a substrate, for example, a silicon substrate, to excite a waveguide mode in the core thin film, the component of a wavevector of the incident light beam must equal that of the waveguide mode. A prism, for example, as illustrated in FIG. 4, may be configured to enable this wavevector matching. If the prism has a refractive index of $n_{prism}$, and an angle of incidence of the light beam within the prism is θ, then the necessary requirement for matching wavevector components is shown in Eq (1) or Eq (2) below:

$$k_{prism} \sin\theta = k_{mode}; \qquad \text{Eq (1)}$$

and $$\sin\theta = \frac{n_{mode}}{n_{prism}}. \qquad \text{Eq (2)}$$

Figure 8:
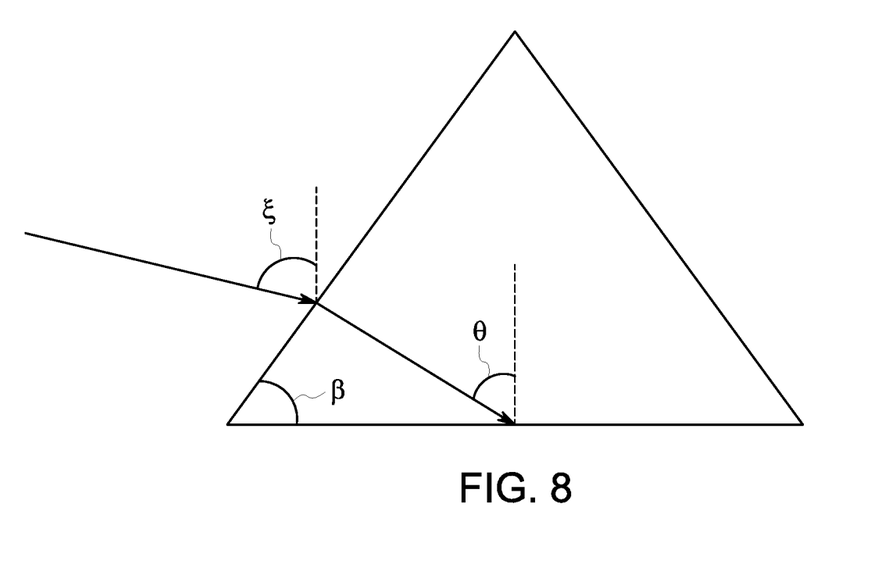
FIG. 8 illustrates that a prism on the opposite side of the substrate from a waveguide is used to couple light into the waveguide, according to an embodiment of the present disclosure. The angle of the incident light within the prism is θ and within air is ξ.

A mode index, $n_{mode}$, for the waveguide mode may be calculated using equations known to one skilled in the art. Commercially available prisms that are transparent in the infrared region may be used. If a coupling prism angle is β, for example, as shown in FIG. 8, then the angle of incidence in air, ξ, is provided by Eq (3):

$$\xi = \sin^{-1}[n_p \sin(\theta-\beta)] + \beta. \qquad \text{Eq (3)}$$

The angle of incidence of the light beam within the silicon substrate is provided by Eq (4):

$$\psi = \sin^{-1}\left(\frac{n_{prism}\sin\theta}{n_{Si}}\right). \qquad \text{Eq (4)}$$

The critical angle between the silicon substrate and water is determined by Eq (5):

$$\psi_c = \sin^{-1}\left(\frac{n_{water}}{n_{Si}}\right). \qquad \text{Eq (5)}$$

Figure 5:
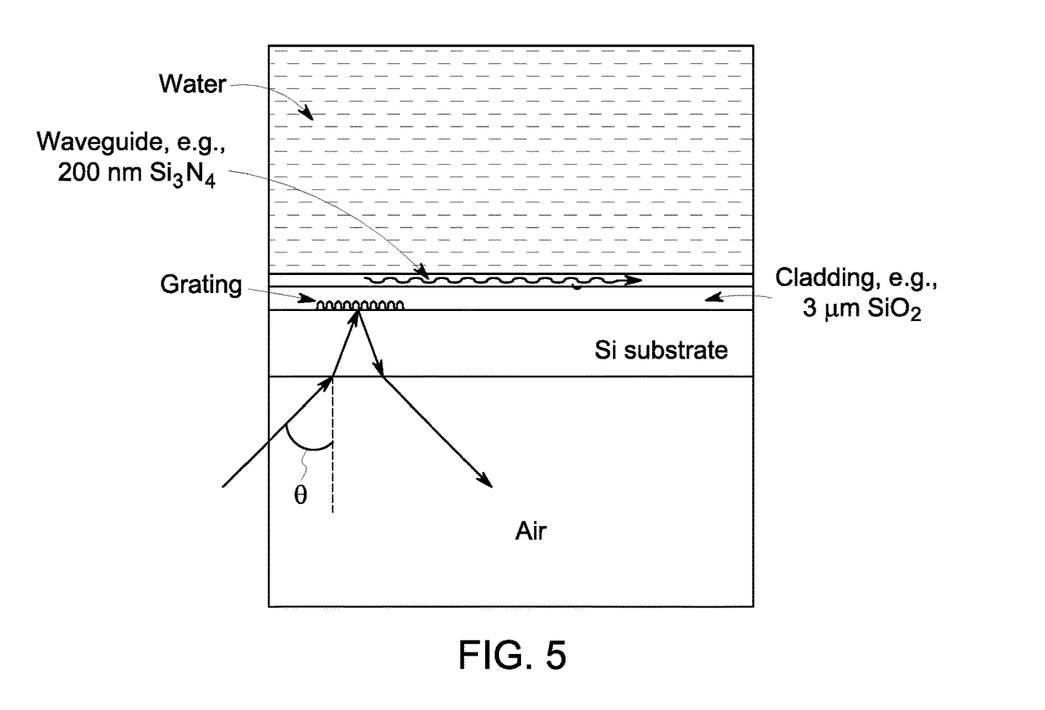
FIG. 5 illustrates an embodiment of the present disclosure in which a grating coupler is used instead of a prism. The diffraction grating is located within the core/cladding region of the waveguide. For normal incidence (θ=0°), $n_{mode}=1.4806$, $n_{prism}=1.75$ and $\lambda_0=2$ μm, so the grating period is 1.35 μm. The same grating period would be selected to out-couple the waveguide light.
Figure 6:
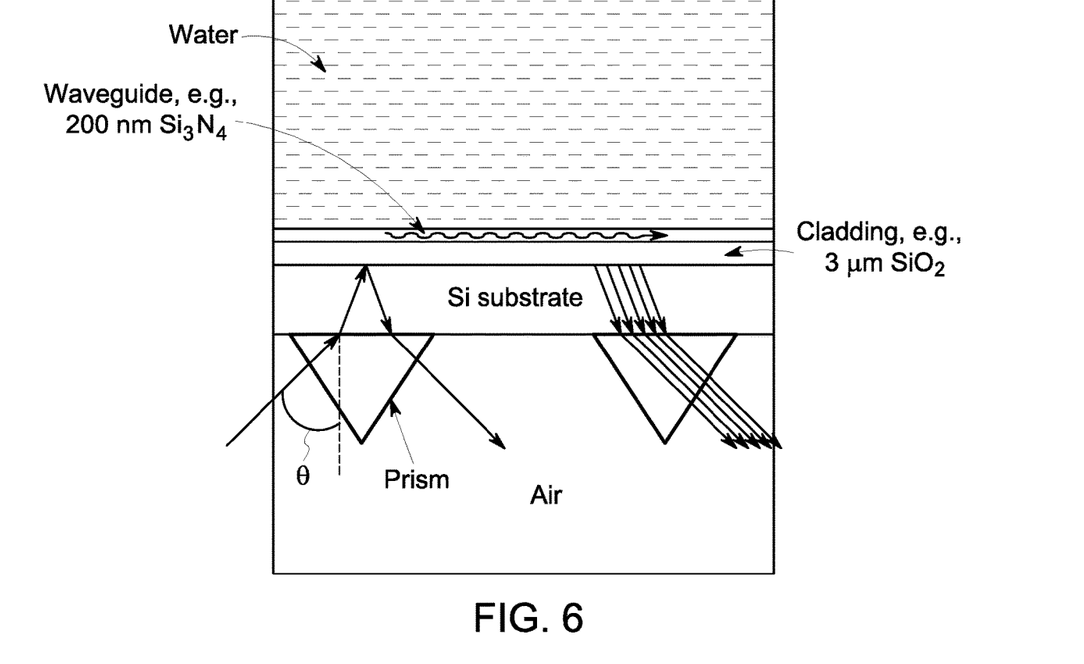
FIG. 6 illustrates an embodiment of the present disclosure similar to FIG. 4, and with a second prism that is used to couple light out of the waveguide to a detector.
Figure 7:
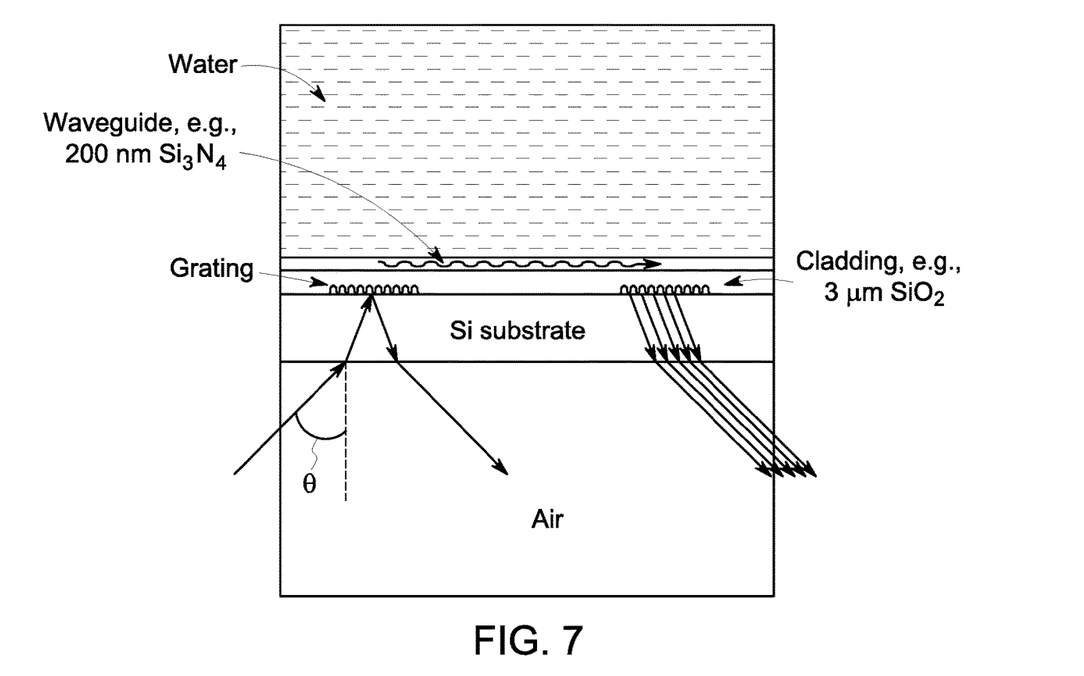
FIG. 7 illustrates an embodiment of the present disclosure similar to FIG. 5, and with a second grating that is used to couple light out of the waveguide to a detector.

FIG. 5 illustrates another embodiment of the present disclosure where the prism is replaced by a diffraction grating located within the core/cladding region of the waveguide. The grating takes the place of the prism. The angle of incidence which couples light into the waveguide may be adjusted by adjusting a period of the grating, p. By adjusting a depth of the grating, a coupling efficiency may be adjusted. By chirping the grating (slightly varying the period of the grating from one end to the other), the grating can be configured to efficiently couple light over a broader range of wavelengths and/or angles of incidence than for a traditional grating.

The diffraction grating adds or subtracts integer multiples of a grating vector from the component of the incident light wavevector in the plane of the waveguide, and when the sum of the two is equal to the waveguide mode wavevector, then light couples into the waveguide. In particular, the coupling equation is shown in Eq (6):

$$\sin\theta = \frac{n_{mode}}{n_{prism}} \pm \frac{m\lambda_0}{pn_{prism}} \qquad \text{Eq (6)}$$

where m is an integer and p is the period of the grating. In some embodiments, m=1 may be chosen.

In the present disclosure, coupling prisms from a variety of sources, including Thorlabs, Edmund Scientific and Karl Lambrecht, Inc, may be used. Broadband light sources available from various sources, including Thorlabs, Newport Corp., and Edmund Scientific, may be used. Wafer substrates available from various sources, including University Wafer and WRS Materials, may be used. Thin film coatings available from various sources, including Hionix, Inc., and Lionix BV, may be used. Spectrometers available from various sources, including Spectral Products, Newport, and Ocean Optics, may be used. Detectors available from various sources, including Thorlabs, Newport Inc., Cal Sensors, and Agiltron, may be used.

Figure 9:
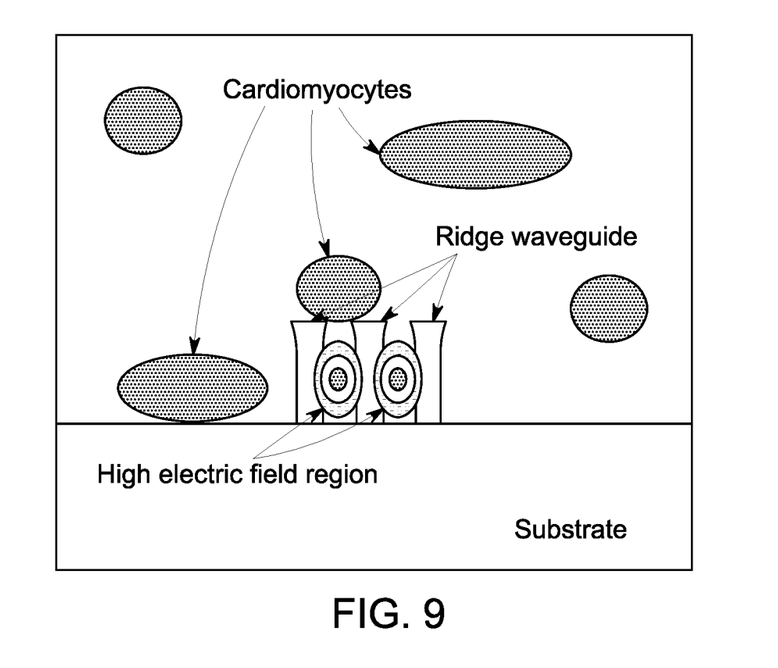

Referring now to FIG. 9, which illustrates an embodiment of the present disclosure, in which a ridge waveguide comprising multiple ridges is disposed on top of a substrate. The waveguide may be configured such that the top surface of each ridge is slightly wider than the rest of the ridge as shown in FIG. 9. The gaps at the top surface of the ridges between the ridges are narrower than a size of particulates. For example, if the particulates are primarily cardiomyocytes in a bioreactor solution with an elongated shape that is typically about 100 µm long and about 10 µm to 25 µm wide, then the gaps between ridges at the top surface may be only about 5 µm wide, thereby preventing entry of the cells into the region between the ridges where there is a stronger electric field but still allowing the fluid in the bioreactor to fill the spaces between the ridges and interact with the field from the waveguide mode.

In some embodiments of the present disclosure, a ridge waveguide is provided and configured to enable waveguide spectroscopy of a fluid in contact with a core of the waveguide, while simultaneously excluding particulates of certain sizes from entering a high electric field region of the waveguide within the fluid. In one embodiment, the waveguide is configured with multiple ridges spaced within substantially one wavelength or less such that a gap between ridges is less than a size of particulates within a surrounding fluid. The gap at the top surface of the ridges between the ridges may be smaller than a size of particulates, which is necessary to prevent particulate entry into the gaps.

The ridge waveguide may be configured with a top surface of at least one of the ridges being wider than a remainder portion of the at least one of ridges.

In some embodiments, the ridge waveguide may comprise silicon on a silicon substrate. The materials of the ridge waveguide may be selected from a group consisting of Si3N, Al2O3, Ta2O5, SixOyN1−x−y, Si, Ge, diamond, ZnS, and ZnSe.

The process for fabrication of ridge waveguides for a wide variety of configurations is known to one skilled in the art and may be performed at various different fabrication facilities.

Figure 10:
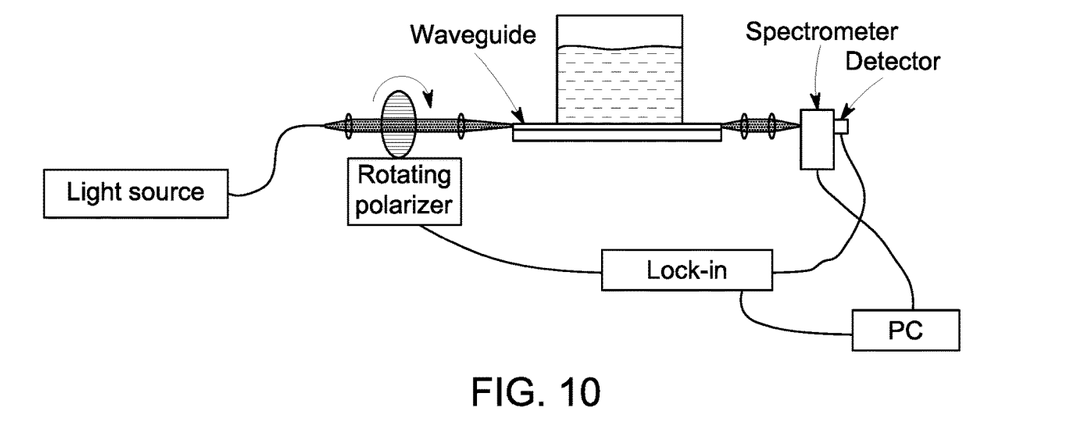
FIG. 10 illustrates a waveguide spectroscopy system using a rotating polarizer as a means to modulate an intensity of the light transmitted through a waveguide, according to an embodiment of the present disclosure.
Figure 11A:
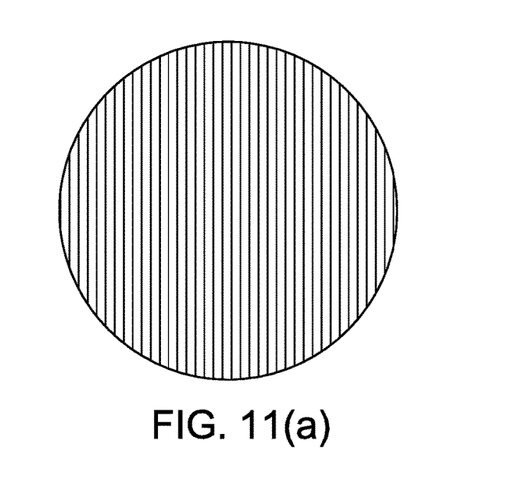
Figure 11B:
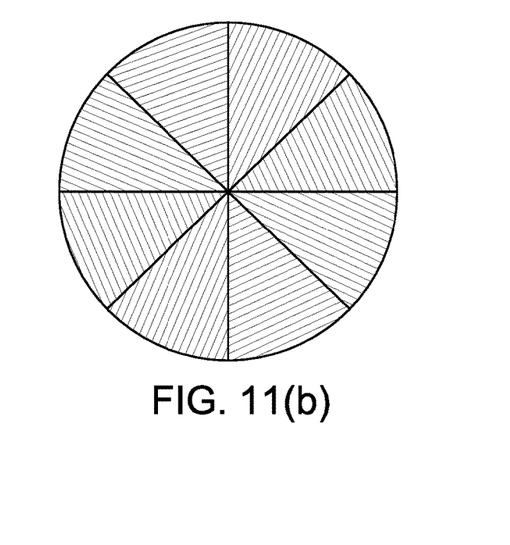

Referring now to FIG. 10, which illustrates an embodiment of the present disclosure, in which a light from a light source may be unpolarized, circularly polarized, or linearly polarized with a polarization orientation at 45°. The light source may be linearly polarized such that an orientation of the light source is at 45° to the orientation for exciting either TE or TM waveguide modes A rotating polarizer, as further illustrated in FIG. 11(a) or 11(b), is also provided. The light is focused onto a waveguide having a waveguide core in contact with a sample and a waveguide cladding beneath the waveguide core. A substrate may be beneath the cladding. In FIG. 10, the rotating polarizer is shown to be positioned between the light source and the sample. Other configurations of the rotating polarizer are also contemplated. For example, in some embodiments, the rotating polarizer may be placed between the sample and the detector. FIG. 10 further illustrates that a spectrometer or a monochromator may be positioned after the sample. It is to be understood that the spectrometer or the monochromator may also be placed between the light source and the sample. If the light source is a single wavelength light source (for example, a laser) or a tunable light source (for example, a tunable laser), then a spectrometer or monochromator may not be required.

The rotating polarizer may rotate at a first specific frequency. This causes a polarization of a transmitted light to be modulated at a second specific frequency which may be a multiple of the rotation frequency. If the polarizer comprises segments as shown in FIG. 11(b), then the light transmitted through the polarizer should be alternately polarized in a direction of a TE waveguide mode and a TM waveguide mode, which are at 0° and 90°, respectively, in the embodiment illustrated. For a rotating sheet polarizer illustrated in FIG. 11(a), a polarization of a transmitted light varies continuously from 0° to 90° as the polarizer rotates. If the rotating polarizer is placed in front of the waveguide, then the transmitted light focused onto the waveguide excites both the TE and TM modes with a 90° phase shift in their modulation intensity. If the rotating polarizer is placed after the waveguide then it transmits light from both TE and TM waveguide modes with a 90° phase shift between them.

The light intensity for the transmitted TE and TM modes may be separately measured and subtracted or divided to obtain a final spectrum. In other embodiments, the intensity of the light for the combined transmitted TE and TM modes may be measured by a single detector with a lock-in amplifier or a phase-sensitive synchronous detection electronics. If the light intensity transmitted through the waveguide for both modes is equal, then there is no change in the light intensity as the rotating polarizer rotates. The detected light intensity is modulated by the rotating polarizer only when there is a change in the transmitted light intensity of the two polarizations of the waveguide modes. If the transmitted light intensity of the two polarizations is different due to some factor other than absorption by the sample, such as different efficiencies of coupling light into the two modes, then the transmitted light intensity of the two modes can be compensated to be equal at the detector by adjusting the input polarization of the light source to put more light into the weaker mode, for example. A lock-in amplifier may be used to synchronously detect the signal transmitted through the polarizer and waveguide. Because the two modes have a relative 90° phase shift in their modulation signals, the signal levels of the two modes can also be compensated and adjusted for zero output signal from the lock-in by adjusting the phase of the lock-in detection relative to the phase of the rotating polarizer.

Figure 12:
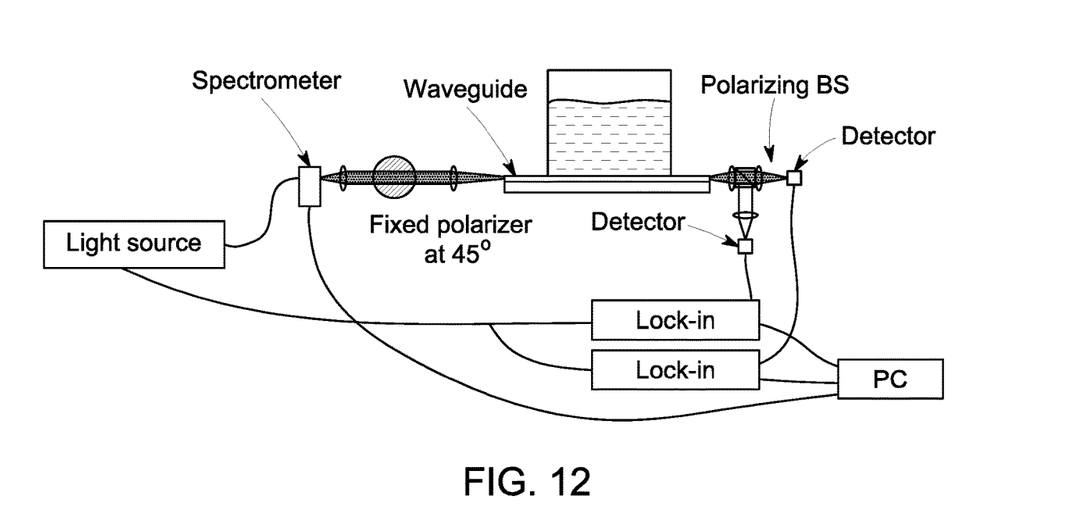
FIG. 12 illustrates a waveguide spectroscopy system using a fixed polarizer and a polarizing beamsplitter to monitor an intensity of a light transmitted through a waveguide, according to an embodiment of the present disclosure.

In one embodiment, a polarizer is not rotating but is fixed at an orientation that passes light at 45° to that which excites either TE or TM waveguide modes. In another embodiment as illustrated in FIG. 12, a polarizer is not rotating but fixed at a 45° orientation with respect to a waveguide. If an unpolarized light from a light source is transmitted through the polarizer, half of the light will excite a TE waveguide mode and half of the light will excite a TM waveguide mode. At an output of the system a polarizing beam splitter is provided, which reflects the light from one of these modes to one detector, while the transmitted light goes to a second detector. Two lock-in amplifiers may be used to detect the TE and TM mode transmitted signals separately, as illustrated. If detected output signal amplitudes for the two modes are not equal, a gain of a detector electronics may be adjusted to make the detected output signal amplitudes form the two lock-in amplifiers equal.

Figure 13:
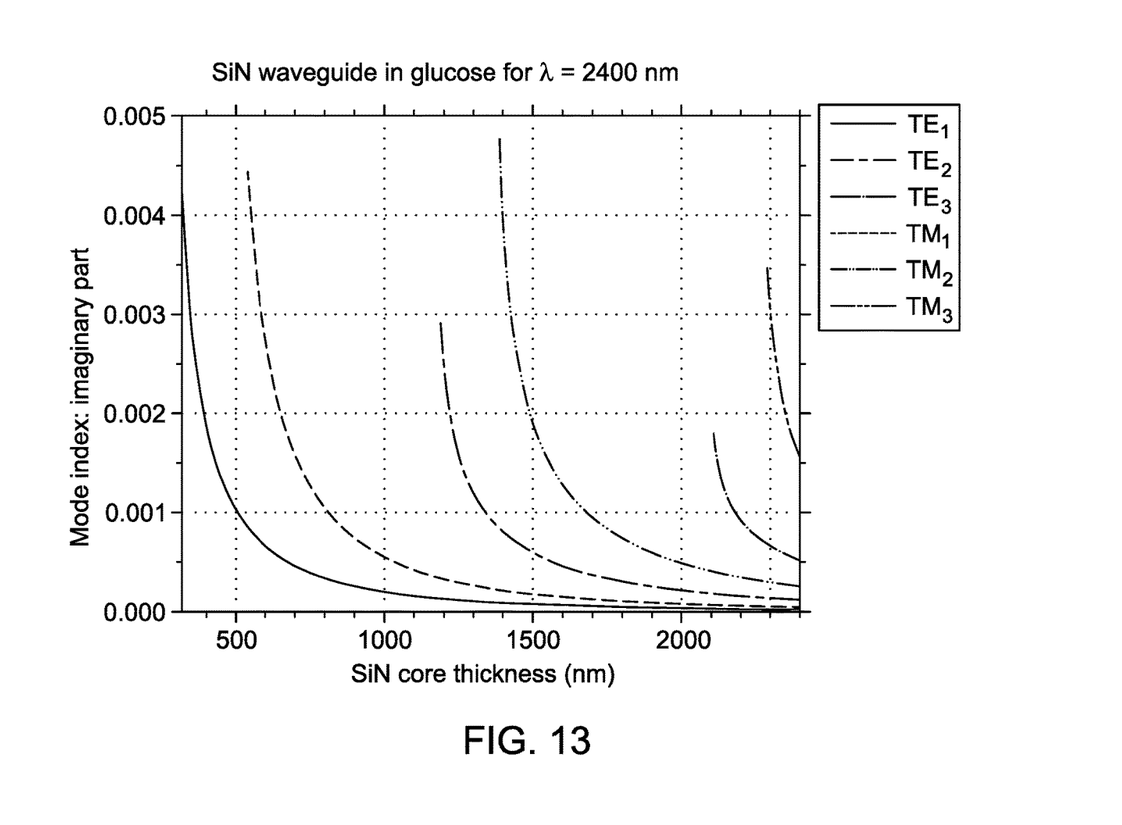
FIG. 13 is a graph showing an imaginary part of a mode index for a 100 M glucose solution in contact with a $Si_3N_4$ waveguide core deposited onto a fused silica substrate for TE and TM waveguide modes as a function of SiN core thickness.

TE and TM modes interact differently with the fluid in contact with the core of the waveguide. The electric field penetration into the fluid depends on the type of mode and the specifics of the core/cladding thicknesses and refractive indices. In FIG. 13, an imaginary part of a waveguide mode index, which measures how quickly a light propagating in the waveguide gets attenuated, is plotted as a function of core thickness for a $Si_3N_4$ core on a fused silica substrate and a glucose solution. The calculation may be based on standard waveguide formulation that is known to one skilled in the art. In this calculation, the core and the cladding are not absorbing. Only the glucose solution is absorbing, so the imaginary part of the mode index is due to the absorption of light in the glucose solution. Depending on the core thickness, different numbers of TE and TM modes may exist in the waveguide. If the core is too thin, then no propagating modes of either polarization exist. As the core thickness increases from a starting point of zero, it first reaches a thickness for which the $TE_0$ mode can propagate as indicated by the value for the imaginary mode index for core thicknesses greater than about 320 nm. The large imaginary part of the mode index at this core thickness indicates that the $TE_0$ waveguide mode is highly attenuated. In general, this is desirable because it indicates that the mode is interacting strongly with the sample solution such as the glucose solution. As the core thickness is further increased, the attenuation of the $TE_0$ mode drops quickly. Once the core thickness reaches about 540 nm, a first TM mode ($TM_0$) begins to propagate. It also has a very large imaginary mode index for the core thickness of about 540 nm, indicating that it is highly attenuated. However, the imaginary part of the mode index for the $TE_0$ mode at this core thickness is much smaller. Therefore, at this core thickness the $TM_0$ mode is interacting much more strongly with the glucose solution than the $TE_0$ mode.

Figure 14:
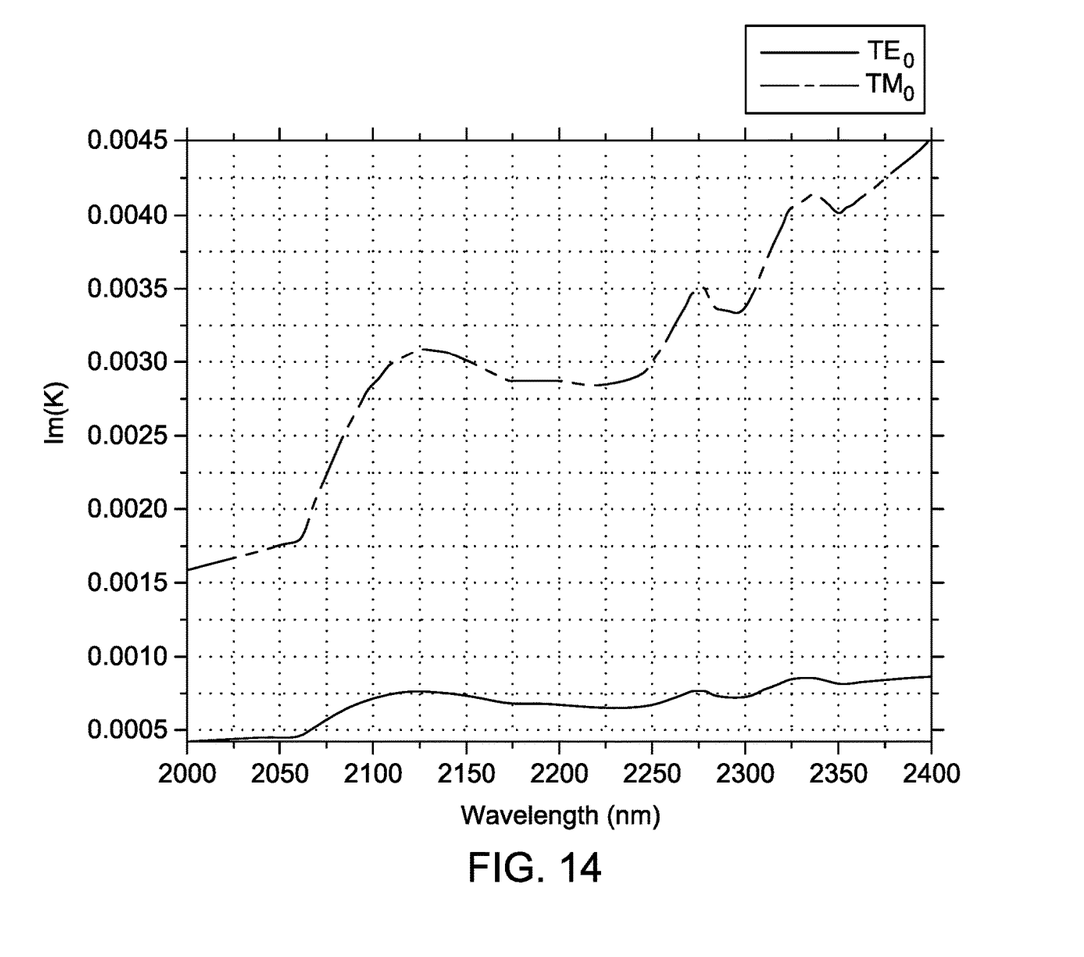
FIG. 14 is a graph showing an imaginary part of a mode index (Im(K)) for a 100 M glucose solution above a 550 nm $Si_3N_4$ waveguide core deposited onto a fused silica substrate for $TE_0$ and $TM_0$ waveguide modes as a function of wavelength (nm).

The imaginary part of the mode index as a function of wavelength is plotted in FIG. 14 for a fixed core thickness of 550 nm for both $TE_0$ and $TM_0$ modes. The nonzero value for the imaginary part of the mode index is due entirely to the absorption by the glucose in the model calculation. It is clearly shown that a significant difference exists in the absorption due to the glucose between the two different modes, with the $TM_0$ mode exhibiting a larger attenuation than the $TE_0$ mode over the entire wavelength range.

Figure 15:
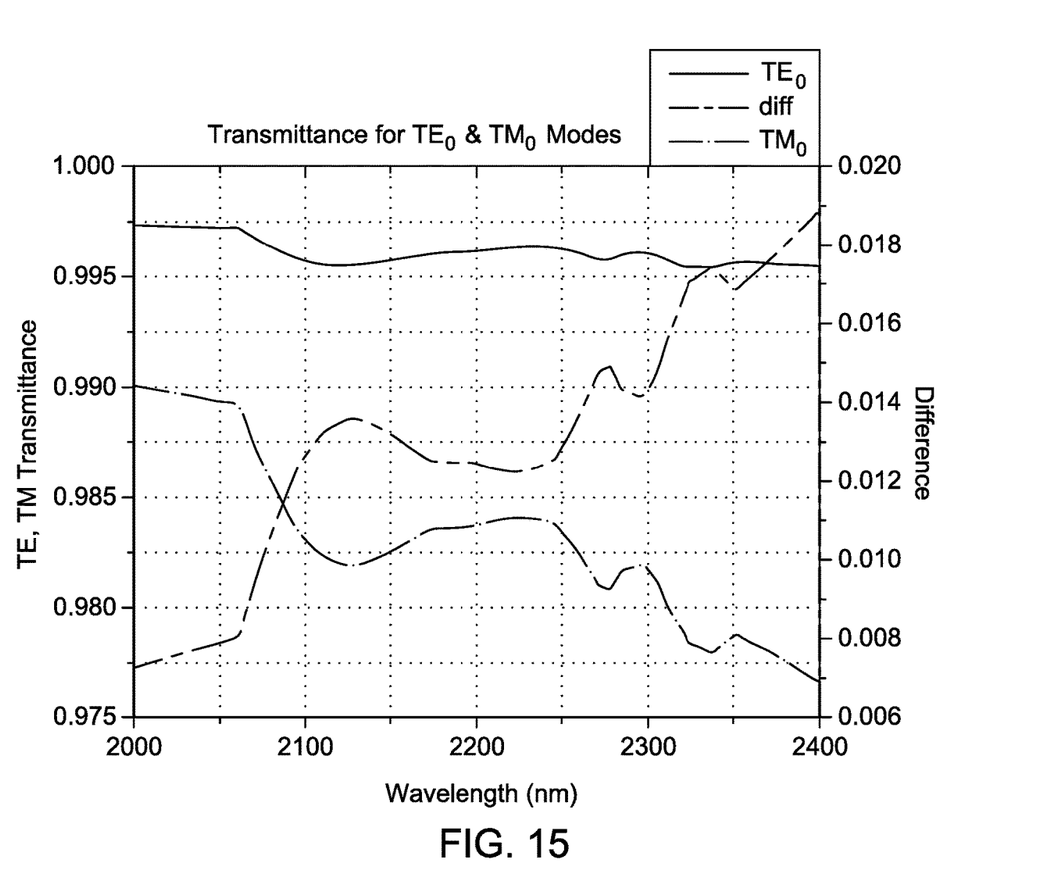
FIG. 15 is a graph showing a spectral transmittance through 1 cm of a waveguide for both $TE_0$ and $TM_0$ modes, and the difference in spectral transmittance.

As illustrated in one embodiment shown in FIG. 12, signals of transmittances of TE and TM modes may be detected separately by different lock-in amplifiers. These signals may be digitally subtracted or divided by a controlling computer. FIG. 15 exhibits calculated transmittance through a 10 mMol solution of glucose along a 1 cm waveguide for the $TE_0$ and $TM_0$ modes, as well as a transmittance difference spectrum. The transmittance difference spectrum clearly exhibits the absorption features of the glucose solution and may, therefore, be used to determine glucose concentration. By subtracting the signals from the TE and TM modes, common changes in source light intensity or in waveguide coupling efficiency or in any other factor that affects the signal intensity similarly of both modes may be substantially removed from the difference/divided spectrum, thereby providing an ability to make long term measurements of a spectral absorbance of the glucose solution without the need to provide a pure solution, for example, a sample free of particulates, to the waveguide sensor periodically for a background spectral measurement.

Polarizer or polarizer segments may be made from one or both of a sheet polarizer and a wire grid polarizer. Sheet polarizers and wire grid polarizers available from a number of sources for various wavelength ranges, including Thorlabs, Edmund Scientific, and Knight Optical. These may be cut to a proper shape and polarization angle and attached to a rotating "chopper" mount. Rotating "choppers" are available from various sources including Thorlabs, Edmund Scientific and Newport Corp. In some embodiments, the polarizer may be a polarizing beamsplitter cube, a Glan-Thomson prism, a Wollaston prism, a Glan-Taylor prism, or any combination thereof.

The invention claimed is:

1. An apparatus for waveguide spectroscopy of a sample inside a container, the apparatus comprising:
   a substrate with a window that is transparent at the wavelengths of interest and is coupled to the container holding a sample;
   a waveguide core of a material that is transparent at the wavelengths of interest located on an inner surface of the transparent window adjacent the sample, the waveguide core having a refractive index greater than that of the sample,
   an optical element configured to couple light into and out of the waveguide,
   a light source located outside of the container,
   one or more detectors located outside of the container; and
   at least one polarizer positioned between the light source and the waveguide core, positioned between the waveguide core and the detector, or in both positions, the at least one polarizer configured to adjust a transmitted light intensity.

2. The apparatus of claim 1, wherein the waveguide comprises a cladding and the waveguide core has a refractive index greater than that of the cladding deposited between the core and the substrate.

3. The apparatus of claim 1, wherein the waveguide comprises a cladding having a refractive index less than that of the substrate, and wherein the cladding has a thickness that is three or more wavelengths.

4. The apparatus of claim 1, wherein the waveguide core has a refractive index greater than that of the substrate.

5. The apparatus of claim 1, wherein the optical element comprises one of a prism and a grating.

6. The apparatus of claim 5, wherein the prism is situated on the window outside of the container.

7. The apparatus of claim 5, wherein the grating is located adjacent or within the waveguide on the inside of the container.

8. The apparatus of claim 1, wherein the waveguide core has a thickness configured to transmit a single TE polarized waveguide mode.

9. The apparatus of claim 1, wherein the waveguide core has a thickness configured to transmit a single TE polarized waveguide mode and a single TM polarized mode.

10. The apparatus of claim 1, wherein the core is made of a material selected from the group consisting of Si3N4, Al2O3, Ta2O5, SixOyN1-x-y, Si, Ge, diamond, ZnS, and ZnSe.

11. The apparatus of claim 1, wherein the waveguide has a cladding made of a material selected from the group consisting of SiO2, MgF2, CaF2, and SixOyN1-x-y.

12. The apparatus of claim 1, wherein the substrate is made of a material selected from the group consisting of Si, glass, fused silica, Al2O3, ZnS, ZnSe, diamond, KBr, BaF2, and CaF2.

13. The apparatus of claim 1, further comprises a device located outside of the container and configured to make spectroscopic measurements.

14. The apparatus of claim 13, wherein the device comprises at least one of a spectrometer and a filter.

15. The apparatus of claim 1, wherein the polarizer rotates at a specific frequency causing the polarization of the transmitted light to rotate.

16. The apparatus of claim 1, wherein the polarizer comprises a multi-segment polarizer that rotates at a specific frequency in which neighboring polarizer segments are oriented orthogonal to each other, and half of the segments are oriented to pass light appropriate for TE waveguide modes and half are oriented to pass light for TM waveguide modes.

17. The apparatus of claim 16, wherein the polarizer or polarizer segments are made from one or both of a sheet polarizer and a wire grid polarizer.

18. The apparatus of claim 1, wherein the polarizer does not rotate and is fixed at an orientation that passes light at 45° to that which excites either TE or TM waveguide modes.

19. The apparatus of claim 1, wherein the light source is unpolarized or circularly polarized.

20. The apparatus of claim 1, wherein the light source is linearly polarized such that an orientation of the light source is at 45° to the orientation for exciting either TE or TM waveguide modes.

21. The apparatus of claim 1, wherein the light intensity for transmitted TE and TM modes are separately measured and subtracted or divided to obtain a final spectrum.

22. The apparatus of claim 1, wherein an intensity of the light for combined transmitted TE and TM modes is measured by a single detector with a lock-in amplifier or a phase-sensitive synchronous detection electronics.

23. The apparatus of claim 1, wherein the polarizer is a polarizing beamsplitter cube, a Glan-Thomson prism, a Wollaston prism, a Glan-Taylor prism, or any combination thereof.

* * * * *